United States Patent Office 3,309,344
Patented Mar. 14, 1967

3,309,344
FLUORINE-CONTAINING POLYMER
James W. Dale, Winchester, and Gerald J. O'Neill, Boston, Mass., assignors to Monsanto Research Corporation, St. Louis, Mo., a corporation of Delaware
No Drawing. Filed Sept. 9, 1963, Ser. No. 307,348
4 Claims. (Cl. 260—79)

This invention relates to polymers, and more particularly, provides new polymers containing fluorine and a method of making the same from sulfur tetrafluoride.

Sulfur tetrafluoride has previously been observed to be a potent fluorinating agent for carbonyl compounds, which replaces the oxygen of the carbonyl group by two fluorine atoms under mild conditions such as temperatures as low as 50° C. (U.S. 2,859,245). For example, reaction of benzophenone with sulfur tetrafluoride provides difluorodiphenylmethane:

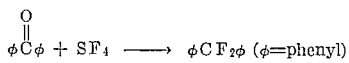

With benzil the product is 1,2-diphenyl tetrafluoro ethane:

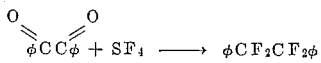

and with an ester such as methyl benzoate, the product is reported to be the cleavage product, benzotrifluoride:

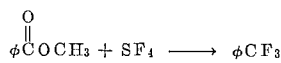

It has now been found that on contacting sulfur tetrafluoride with an oxalate ester, the product is unexpectedly a polymeric material with a high molecular weight and excellent thermal stability, which is apparently a copolymer of the oxalate ester and the sulfur tetrafluoride.

As will be apparent from the foregoing discussion, this result is novel and unexpected. The adjacent carbonyl groups in an oxalate ester

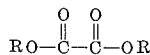

(R=aryl group) would be expected to undergo displacement of the oxygen by fluorine, in analogy to the benzil reaction mentioned above, while the ester oxy linkages would be cleaved, as is the case with the methyl benzoate ester reported reaction. Instead, as stated, it is an addition-polymerization reaction which occurs.

The addition of the sulfur tetrafluoride to the oxalate ester to form the polymeric addition product conceivably results in formation of a cyclic structure as the repeating unit in the chain, such as

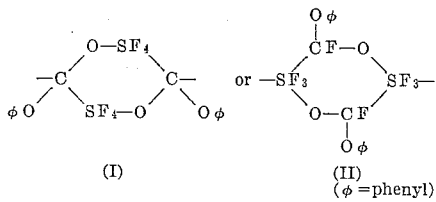

The formula designated as I is considered more probable than II. In any case, it can be said that the presently provided polymers are the additive copolymers of 2 moles of sulfur tetrafluoride per mole of oxalate ester, and that it is the addition product of the stated compounds in this ration which forms the repetitive unit of the polymer.

Shaped objects of desired configurations are readily produced in accordance with the present invention, by forming the polymer in a chamber with an interior of the desired shape. As the condensation of the oxalate ester and sulfur tetrafluoride proceeds, polymer is formed as a single coherent mass with an exterior configuration conforming to the interior shape of the container. Shaped objects made of the presently provided polymer may be employed as structural components, for example as materials of construction providing panels, walls, cups and the like components of equipment assemblies, paritcularly those which will be exposed in use to elevated temperatures, useful for example as dielectric materials. The polymer can also be used to prepare laminates, using glass fabric as reinforcement, for example. As noted above, the thermal stability of the presently provided polymeric materials is especially unusual, and the shaped objects constructed from the polymer resist degradation at temperatures extending up to as high as 350° C. They are also materials with outstanding chemical resistance, and resistance to burning.

The method of the invention is carried out by contacting sulfur tetrafluoride with an oxalate ester, in a ratio of at least 2 moles of sulfur tetrafluoride per mole of oxalate ester.

The presently useful oxalate esters are aromatic oxalate esters, that is, the di-aryl esters of oxalic acid, where the esterifying aryl group is a carbocyclic aromatic hydrocarbon, including at least one benzene ring. The aromatic ring system may be unsubstituted or substituted by hydrocarbon radicals, such as methyl, t-butyl, phenyl, alpha-cumyl, or the like. Thus, exemplary of the esters convertible to polymeric products in accordance with the present invention are diphenyl oxalate, dinaphthyl oxalate, dibiphenylyl oxalate, di-p-tolyl oxalate, dixlyl oxalate, bis(p-t-butylphenyl) oxalate, bis($\alpha$-cumylphenyl) oxalate, bis(dodecylphenyl) oxalate, bis(phenoxyphenyl) oxalate, bis(p-benzylphenyl) oxalate, bis(cyclohexylphenyl) oxalate, bis(m-diphenylphenyl)-oxalate and the like.

The ratios of the oxalate ester and sulfur tetrafluoride in the reaction mixture may vary. At least enough sulfur tetrafluoride will be consumed to supply two moles per mole of oxalate ester. The polymer is produced having the 2:1 sulfur tetrafluoride:oxalate ester molar ratio when the amount of sulfur tetrafluoride introduced is as high as 8 moles per mole of oxalate ester. In general, the sulfur-tetra-fluoride-to-oxalate ester molar ratio will be in the range of from 1:1 to 15:1. The reaction mixture may consist of the stated reactants alone, or may also include inert diluents, such as nitrogen, perfluoropropane or the like.

In conducting the method of the invention, the sulfur tetrafluoride will be contacted with oxalate ester under superatmospheric pressure. In general, the pressures required are those sufficient to liquefy the sulfur tetrafluoride, at least partially, at the reaction temperature. The addition polymerization of these reactants proceeds at useful rates at surprisingly low temperatures, such as room temperature (about 25° C.). At such temperatures, pressures required to liquefy a significant proportion of the sulfur tetrafluoride present, above about 10% of the total, for example, are moderate: usually below 50 atmospheres, for example. Higher pressures, up to about 5000 atmospheres, say, can be used if desired.

The reactants will be maintained in contact, under pressure, until polymer formation has occurred. If desired, the reaction time may be shortened by, for example, increasing the temperature or pressure. In general, the temperature at which the reaction is carried out will be in the range of from 0° to 150° C. During or after completion of the reaction, if desired, the polymer may be heated at more elevated temperatures, for example at 200° C. or above, whereby residual and occluded sulfur tetrafluoride is driven out from the polymeric mass.

If desired, during or after the polymerization, usual polymer additives can be introduced, including for example plasticizers such as diphenyl oxide, diphenoxybenzene or the like, fillers such as talc, asbestos or the like, and so forth.

The invention is illustrated but not limited by the following examples.

*Example 1*

A round-bottomed cylindrical autoclave was charged with 65 grams (g.) of diphenyl oxalate, and 230 g. of sulfur tetrafluoride was condensed into the cylinder, which was then closed and left standing at room temperature (about 25° C.) for about 65 hours, in a vertical position. At the end of this time, the cylinder contained the polymeric addition product of the reactants, as a coherent solid mass having a semispheroidal shape conforming to the interior of the cylinder. The cylinder was then inserted in a horizontal furnace where it was maintained at 200° C. for 8 hours, and then removed from the furnace and then let cool overnight.

The cylinder was then opened, and the solid contents removed. These contents were a solid coherent hemispherical mass of polymeric material, of the shape assumed in the initial low temperature polymerization, and having a black glassy surface. The weight of the mass was found to be 126 g., but when weighed it still contained a small amount of absorbed sulfur tetrafluoride, as evidenced by formation of fumes and the odor of $SF_4$. Addition of 2 moles of sulfur tetrafluoride to all of the diphenyl oxalate charged would theoretically provide a product weight of 123 g.

The polymeric mass was brittle, and easily broken into smaller lumps by striking with a metal bar. On fragmentation, the solid was seen to be a mixture of yellow and black particles. Exposure of the darker particles to air produced a gradual lightening of some to a yellow color.

The polymer did not support combustion. When held in a flame, it glowed and slowly charred, but combustion stopped as soon as it was removed from the flame.

The polymer was found to be insoluble in water, dioxane, benzene, toluene, petroleum ether (30–60°), ethyl acetate, nitrobenzene, ethyl trifluoroacetate, acetone, pyridine, and ethyl oxalate; acetonitrile, dimethylformamide and carbon disulfide. It was not attacked by dilute sulfuric acid or by 10% sodium hydroxide.

Shaking the solid mass with water for 24 hours failed to extract soluble matter: the weight of the sample remained unchanged.

The material washed with water for 24 hours and dried was crushed and the light yellow particles manually separated from the darker ones. Both the yellow and the black materials were found to have the same infrared absorption spectrum. They contained no evidence of any $SF_4$ absorption bands, but did show an absorption at $6.3\mu$ which corresponds to one of the absorption bands of $SF_6$. The calculated values for elemental analysis of the 2:1 molar ratio adduct are percent C, 36.7, percent F, 33.2. The values found for the yellow material were C: 35.9, 37.4%; F: 29.9, 27.4%. Those found for the black product were C: 39.7, 39.9%; F: 22.6, 22.5%.

A portion of the yellow product was washed with boiling water for several hours, filtered off, and dried. It was then gradually heated and its behavior observed. No substantial amount of vapor came off from the sample until it had heated up to 350° C., and no appearance of liquid was detected during continued heating up to 550° C.

*Example 2*

A cylinder was charged with 10 g. of diphenyl oxalate, 15 g. of $SF_4$ was condensed into the cylinder, and the cylinder was sealed and held at 100° C. for 6 hours. A resinous polymer was produced, as a film tightly coating the inner cylinder walls.

While the invention has been described with reference to specific individual embodiments thereof, it is to be appreciated that modifications and variations can be made without departing from the scope of the invention, which is limited only as defined in the appended claims.

What is claimed is:

1. The polymeric product of the reaction of an aromatic oxalate ester which is a di-aryl ester of oxalic acid where the esterifying aryl group is a carbocyclic aromatic hydrocarbon including at least one benzene ring, with at least 2 moles of sulfur tetrafluoride per mole of said oxalate ester, under superatmospheric pressure sufficient to liquefy the said sulfur tetrafluoride at the reaction temperature.

2. The method of producing a fluorine-containing polymer which comprises contacting sulfur tetrafluoride with an aromatic oxalate ester which is a di-aryl ester of oxalic acid where the esterifying aryl group is a carbocyclic aromatic hydrocarbon including at least one benzene ring, under superatmospheric pressures sufficient to liquefy the said sulfur tetrafluoride at the reaction temperature.

3. The polymer of claim 1 wherein said aromatic oxalate diester is diphenyl oxalate.

4. The method of claim 2 wherein said aromatic oxalate diester is diphenyl oxalate.

References Cited by the Examiner

UNITED STATES PATENTS 2,859,245  11/1958  Smith _____ 260—79

FOREIGN PATENTS 908,177  10/1962  Great Britain.

OTHER REFERENCES

Hasek et al.: Journal American Chemical Society, vol. 48, pages 543 to 551, Feb. 5, 1960.

LEON J. BERCOVITZ, *Primary Examiner.*

M. I. MARQUIS, *Assistant Examiner.*